(12) United States Patent
Morota et al.

(10) Patent No.: US 7,729,137 B2
(45) Date of Patent: Jun. 1, 2010

(54) SWITCHING POWER SUPPLY AND REGULATION CIRCUIT

(75) Inventors: Naohiko Morota, Kadoma (JP); Yoshihiro Mori, Kadoma (JP)

(73) Assignee: Panasonic Corporation, Osaka (JP)

( * ) Notice: Subject to any disclaimer, the term of this patent is extended or adjusted under 35 U.S.C. 154(b) by 224 days.

(21) Appl. No.: 12/128,652

(22) Filed: May 29, 2008

(65) Prior Publication Data
US 2008/0309303 A1 Dec. 18, 2008

(30) Foreign Application Priority Data
Jun. 15, 2007 (JP) ............................. 2007-158093

(51) Int. Cl.
*H02M 3/335* (2006.01)
(52) U.S. Cl. ............... 363/21.12; 363/21.17; 363/21.18
(58) Field of Classification Search ............. 363/21.01, 363/21.12, 21.18, 21.17
See application file for complete search history.

(56) References Cited
U.S. PATENT DOCUMENTS
2003/0038669 A1* 2/2003 Zhang ........................ 327/536
2007/0132438 A1* 6/2007 Jang et al. .................... 323/282
2007/0182387 A1* 8/2007 Weirich ....................... 323/234
2008/0084197 A1* 4/2008 Williams et al. ............ 323/282

FOREIGN PATENT DOCUMENTS
EP 1 211 794 12/2001

* cited by examiner

*Primary Examiner*—Bao Q Vu
(74) *Attorney, Agent, or Firm*—Steptoe & Johnson LLP

(57) ABSTRACT

The present invention provides a switching power supply that enables a reduction in noise without the need for an anti-noise component such as a filter circuit. A secondary current on period detecting circuit detects a first period during which a secondary current flows, the secondary current starting to flow through a secondary winding after a switching element is turned off. A secondary current on duty control circuit oscillates a clock signal set turning on the switching element so as to maintain, at a constant value, an on duty ratio of the first period to a third period made up of the first period and a second period during which the secondary current does not flow. A secondary current on duty modulating circuit applies a modulation component to the on duty ratio to periodically modulate the on duty ratio and thus the oscillation frequency of the switching element.

16 Claims, 9 Drawing Sheets

SWITCHING POWER SUPPLY AND REGULATION CIRCUIT

FIELD OF THE INVENTION

The present invention relates to a switching power supply used as, for example, a power supply unit for a charger, and a regulation circuit for use in the switching power supply.

BACKGROUND OF THE INVENTION

For example, as a power supply unit for a charger, a small-sized switching power supply is generally used which comprises an output voltage detecting circuit, a constant current control circuit, and a photocoupler on a secondary side to perform constant voltage control while offering a constant current dropping characteristic.

A switching power supply has also been proposed which allows a further size reduction by omitting the output voltage detecting circuit, the constant current control circuit, and the photocoupler from the secondary side and allowing a primary side to provide these functions (see, for example, Europe Patent Application Publication No. 1211794). This switching power supply performs what is called PFM control by, for a constant voltage region, detecting a voltage generated in an auxiliary winding in a transformer and adjusting an off time of a switching element so that the detected voltage is maintained constant. The switching power supply also offers the constant current dropping characteristic by, for a constant current region, controlling the oscillation frequency of the switching element so as to maintain constant the duty ratio of a secondary current flowing through a secondary winding in the transformer.

However, in the conventional switching power supply, with a fixed load, a more stable switching operation is disadvantageously likely to make the oscillation frequency of the switching element more stable and thereby cause noise (electric noise). Thus, to prevent the possible noise, the conventional switching power supply requires an anti-noise component such as a filter circuit. The anti-noise component prevents a reduction in the size of a power source.

DISCLOSURE OF THE INVENTION

In view of the above-described problems, an object of the present invention is to provide a switching power supply that enables a reduction in noise by applying a modulation component to the oscillation frequency of a switching element, as well as a relevant regulation circuit.

To accomplish this object, a first switching power supply according to the present invention includes:

a transformer having a primary winding and a secondary winding;

a switching element;

a control circuit controlling a switching operation of the switching element to perform switching control on a first DC voltage input to the switching element via the primary winding; and an output voltage generating section converting a voltage generated in the secondary winding by the switching operation of the switching element, into a second DC voltage and supplying the second DC voltage to a load, wherein the control circuit includes:

a drain current limiting circuit generating a signal turning off the switching element when a current flowing through the switching element reaches a set value;

a secondary current on period detecting circuit detecting a first period during which a secondary current flows, the secondary current starting to flow through the secondary winding after the switching element is turned off;

a secondary current on duty control circuit oscillating a clock signal turning on the switching element so as to maintain, at a constant value, an on duty ratio of the first period to a third period comprising the first period and a second period during which the secondary current does not flow; and a secondary current on duty modulating circuit applying a modulation component to the on duty ratio to periodically modulate the on duty ratio.

Furthermore, the secondary current on duty control circuit includes a capacitance, a charging and discharging circuit charging and discharging the capacitance in synchronism with the first period and the second period, and a comparison circuit generating a signal turning on the switching element, when a voltage of the capacitance is detected on the basis of a set voltage, and the secondary current on duty modulating circuit applies the modulation component to one of a charge current into the capacitance and a discharge current from the capacitance.

Furthermore, the secondary current on duty control circuit includes a capacitance, a charging and discharging circuit charging and discharging the capacitance in synchronism with the first period and the second period, and a comparison circuit generating a signal turning on the switching element, when a voltage of the capacitance is detected on the basis of a set voltage, wherein the secondary current on duty modulating circuit applies the modulation component to the set voltage.

Furthermore, the secondary current on period detecting circuit detects, as a timing when the secondary current stops flowing, a timing of inversion of a voltage polarity which occurs first in each of the windings in the transformer after the switching element is turned off.

Furthermore, the secondary current on period detecting circuit detects, as the timing when the secondary current stops flowing, a timing of inversion of the voltage polarity which occurs first in the primary winding in the transformer after the switching element is turned off.

Furthermore, the transformer further has an auxiliary winding, and the secondary current on period detecting circuit detects, as the timing when the secondary current stops flowing, a timing of inversion of a voltage polarity which occurs first in the auxiliary winding in the transformer after the switching element is turned off.

A second switching power supply according to the present invention includes:

a transformer having a primary winding and a secondary winding;

a switching element;

a control circuit controlling a switching operation of the switching element to perform switching control on a first DC voltage input to the switching element via the primary winding; and an output voltage generating section converting a voltage generated in the secondary winding by the switching operation of the switching element, into a second DC voltage and supplying the second DC voltage to a load, wherein the control circuit includes:

a drain current limiting circuit generating a signal turning off the switching element when a current flowing through the switching element reaches a set value;

a PFM control circuit having a function of oscillating a clock signal turning on the switching element and a function of varying the frequency of the clock signal depending on the second DC voltage so that the second DC voltage is maintained at a constant value; and a PFM frequency modulating circuit applying a modulation component to the frequency of the clock signal so as to periodically modulate the frequency of the clock signal.

Furthermore, the PFM frequency modulating circuit varies the modulation range of the frequency of the clock signal depending on the second DC voltage.

Furthermore, the PFM frequency modulating circuit varies the modulation period of the frequency of the clock signal depending on the second DC voltage.

A third switching power supply according to the present invention includes:

a transformer having a primary winding and a secondary winding;

a switching element;

a control circuit controlling a switching operation of the switching element to perform switching control on a first DC voltage input to the switching element via the primary winding; and an output voltage generating section converting a voltage generated in the secondary winding by the switching operation of the switching element, into a second DC voltage and supplying the second DC voltage to a load, wherein the control circuit includes:

a drain current limiting circuit generating a signal turning off the switching element when a current flowing through the switching element reaches a set value;

a PFM control circuit having a function of oscillating a first clock signal turning on the switching element and a function of varying the frequency of the first clock signal depending on the second DC voltage so that the second DC voltage is maintained at a constant value;

a secondary current on period detecting circuit detecting a first period during which a secondary current flows, the secondary current starting to flow through the secondary winding after the switching element is turned off;

a secondary current on duty control circuit oscillating a second clock signal turning on the switching element so as to maintain, at a constant value, the on duty ratio of the first period to a third period comprising the first period and a second period during which the secondary current does not flow;

a clock signal selecting circuit selecting one having a lower frequency out of the first and second clock signals to turn on the switching element using the selected clock signal; and a modulation circuit having a function of applying a modulation component to the frequency of the first clock signal and a function of applying a modulation component to the on duty ratio to periodically modulate the frequency of the first clock signal and the on duty ratio using the modulation components applied thereto.

A first regulation circuit according to the present invention includes:

a switching element;

a first terminal serving as an input terminal of the switching element and connected to a first winding in an external transformer;

a second terminal serving as an output terminal of the switching element;

a third terminal connected to any one of windings in the transformer; and a control circuit controlling a switching operation of the switching element to perform switching control on a DC voltage input to the switching element via the first terminal, wherein the control circuit includes:

a drain current limiting circuit generating a signal turning off the switching element when a current flowing through the switching element reaches a set value;

a secondary current on period detecting circuit connected to the third terminal and detecting a first period during which a secondary current flows, the secondary current starting to flow through the secondary winding in the transformer after the switching element is turned off;

a secondary current on duty control circuit oscillating a clock signal turning on the switching element so as to maintain, at a constant value, an on duty ratio of the first period to a third period comprising the first period and a second period during which the secondary current does not flow; and a secondary current on duty modulating circuit applying a modulation component to the on duty ratio to periodically modulate the on duty ratio.

A second regulation circuit according to the present invention includes:

a switching element;

a first terminal serving as an input terminal of the switching element and connected to a first winding in an external transformer;

a second terminal serving as an output terminal of the switching element;

a control circuit controlling a switching operation of the switching element to perform switching control on a first DC voltage input to the switching element via the first terminal; and a third terminal to which a voltage corresponding to a second DC voltage supplied to an external load is input, wherein the control circuit includes:

a drain current limiting circuit generating a signal turning off the switching element when a current flowing through the switching element reaches a set value;

a PFM control circuit having a function of oscillating a clock signal turning on the switching element and a function of varying the frequency of the clock signal depending on the voltage input to the third terminal so that the second DC voltage is maintained at a constant value; and a PFM frequency modulating circuit applying a modulation component to the frequency of the clock signal so as to periodically modulate the frequency of the clock signal.

A third regulation circuit according to the present invention includes:

a switching element;

a first terminal serving as an input terminal of the switching element and connected to a first winding in an external transformer;

a second terminal serving as an output terminal of the switching element;

a control circuit controlling a switching operation of the switching element to perform switching control on a first DC voltage input to the switching element via the first terminal;

a third terminal to which a voltage corresponding to a second DC voltage supplied to an external load is input; and a fourth terminal connected to any one of windings in the transformer, wherein the control circuit includes:

a drain current limiting circuit generating a signal turning off the switching element when a current flowing through the switching element reaches a set value;

a PFM control circuit having a function of oscillating a first clock signal turning on the switching element and a function of varying the frequency of the first clock signal depending on the voltage input to the third terminal so that the second DC voltage is maintained at a constant value;

a secondary current on period detecting circuit connected to the fourth terminal and detecting a first period during which a secondary current flows, the secondary current starting to flow through a secondary winding in the transformer after the switching element is turned off;

a secondary current on duty control circuit oscillating a second clock signal turning on the switching element so as to maintain, at a constant value, an on duty ratio of the first period to a third period comprising the first period and a second period during which the secondary current does not flow;

a clock signal selecting circuit selecting one having a lower frequency out of the first and second clock signals to turn on the switching element using the selected clock signal; and a modulation circuit having a function of applying a modulation component to the frequency of the first clock signal and a function of applying a modulation component to the on duty ratio to periodically modulate the frequency of the first clock signal and the on duty ratio using the modulation components applied thereto.

Furthermore, the regulation circuit according to the invention comprises an integrated circuit having the switching element and the control circuit both formed on the same semiconductor substrate.

According to the preferred embodiment of the present invention, for a constant voltage region in which the PFM control is performed, the frequency of the clock signal is modulated to apply the modulation component to the oscillation frequency of the switching element. For a constant current region in which control is performed so as to maintain constant the on duty ratio (the on duty of the secondary current) of the first period to the third period comprising the first period, during which the secondary current flows, and the second period, during which the secondary current does not flow, the on duty of the secondary current is modulated to apply the modulation component to the oscillation frequency of the switching element.

Thus, noise can be reduced without the need for an anti-noise component such as a filter circuit. The eliminated need of the anti-noise component allows a reduction in the size of the switching power source and in costs. Therefore, the present invention is useful for switching power sources for chargers.

Furthermore, according to the preferred embodiment of the present invention, for the constant voltage region, the modulation component is applied to the on duty of the secondary current. Thus, even when a variation occurs in the magnitude of a load and thus in the oscillation frequency of the switching element, the modulation range of the on duty of the secondary current varies depending on the variation in the oscillation frequency. Consequently, noise can be reduced without reducing the accuracy of constant current control.

Furthermore, according to the preferred embodiment of the present invention, for the constant voltage region, the modulation range of the frequency of the clock signal is varied depending on the second DC voltage supplied to the load. Thus, if a variation occurs in the magnitude of the load and thus in the oscillation frequency of the switching element, the modulation range of the frequency of the clock signal varies depending on the variation in the oscillation frequency. Consequently, noise can be reduced without reducing the accuracy of constant voltage control.

The switching power supply and regulation circuit according to the present invention enable a reduction in noise without the need for an anti-noise component such as a filter circuit. This in turn allows a reduction in the size and costs of the switching power source. Therefore, the switching power supply and regulation circuit according to the present invention are each useful as a switching power source used in a charger for a portable apparatus or a power supply circuit in any other electric apparatus.

DESCRIPTION OF THE EMBODIMENTS

Embodiment 1

With reference to the drawings, description will be given of a switching power supply according to Embodiment 1 of the present invention.

Figure 1:
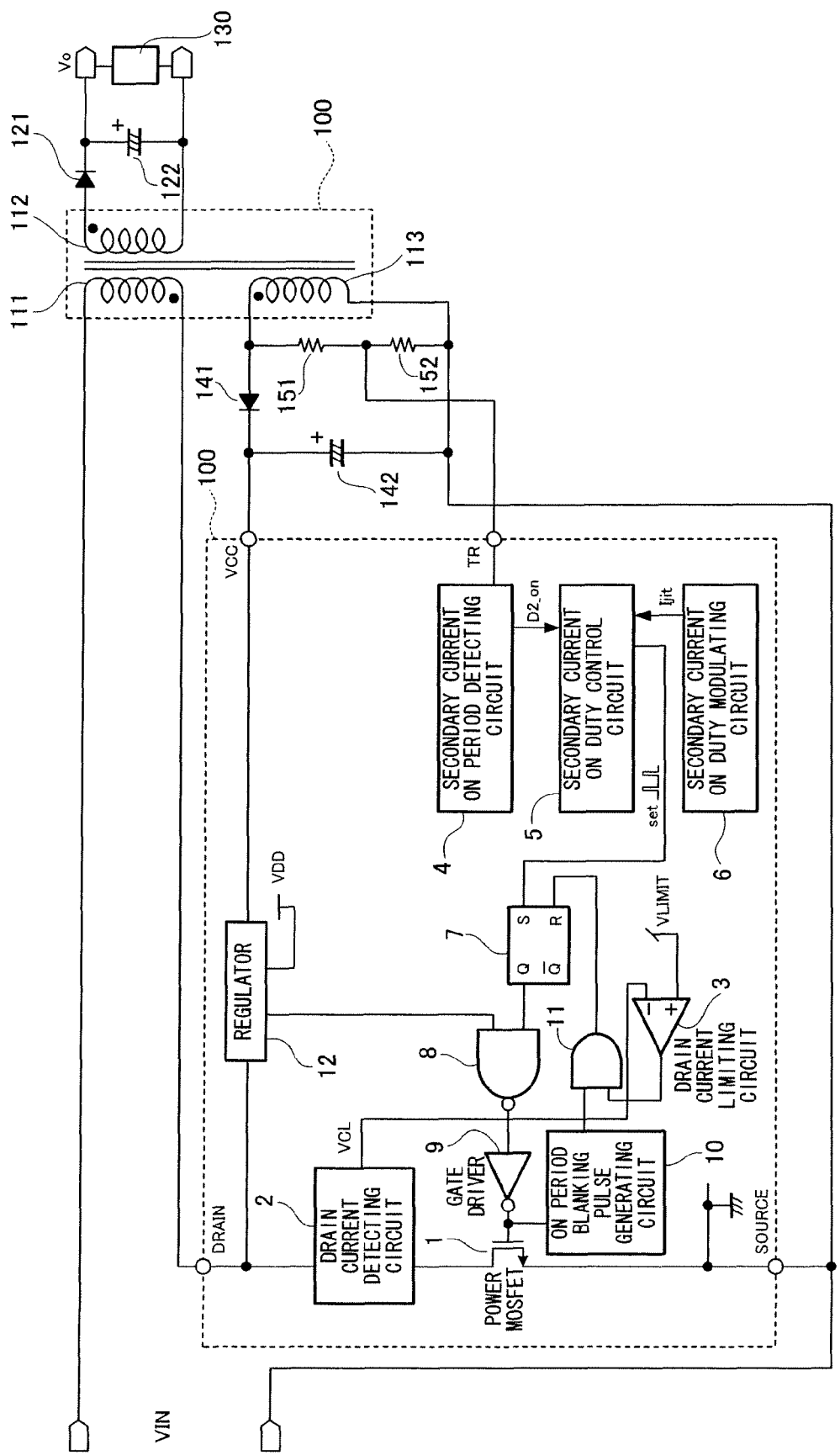
FIG. 1 is a block diagram showing an example of the configuration of a switching power supply according to Embodiment 1 of the present invention.

FIG. 1 is a block diagram showing an example of the configuration of the switching power supply according to Embodiment 1 of the present invention. The switching power supply comprises a constant current control function of controllably maintaining a constant output current within a certain load range, offering a constant current dropping characteristic. The switching power supply does not comprise any constant voltage control function.

In FIG. 1, a semiconductor device (regulation circuit) 100 for controlling a switching power source internally comprises a switching element 1 made up of a power MOSFET and a control circuit that controls a switching operation of the switching element 1.

The semiconductor device 100 comprises four terminals, an input terminal (DRAIN terminal (first terminal)) of the switching terminal 1, an auxiliary power supply voltage input terminal (VCC terminal), a secondary current off timing detecting terminal (TR terminal (third terminal)), and a GND terminal (SOURCE terminal (second terminal)) of a control circuit which corresponds to an output terminal of the switching element 1, as external input terminals.

A transformer 110 comprises a primary winding 111, a secondary winding 112, and an auxiliary winding 113. The primary winding 111 and the secondary winding 112 have opposite polarities. That is, the switching power supply is of a fly back type. The auxiliary winding 113 and the secondary winding 112 have the same polarity. Thus, the auxiliary winding 113 generates an alternate voltage (auxiliary alternate voltage) proportional to an alternate voltage (secondary alternate voltage) generated on the secondary winding 112 by the switching operation of the switching element 1.

The primary winding 111 is connected to the DRAIN terminal of the semiconductor device 100. The control circuit in the semiconductor device 100 controls the switching operation of the switching element 1 to perform switching control on a first DC voltage (input voltage) VIN input to the switching element 1 via the primary winding 111. The switching control allows an alternate voltage to be generated on the secondary winding 112 and the auxiliary winding 113. The first DC voltage VIN is obtained by, for example, rectifying and smoothing a commercial alternate power supply.

An output voltage generating section made up of a diode 121 and a capacitor 122 is connected to the secondary winding 112. The output voltage generating section rectifies and smoothes the secondary alternate voltage generated on the secondary winding 112 by the switching operation of the switching element 1, to convert the secondary alternate voltage into a second DC voltage (output voltage) Vo. The output voltage generating section then supplies the resulting voltage Vo to a load 130.

A rectifying and smoothing circuit made up of a diode 141 and a capacitor 142 is connected to the auxiliary winding 113. The rectifying and smoothing circuit rectifies and smoothes the auxiliary alternate voltage generated on the auxiliary winding 113 by the switching operation of the switching element 1, to convert the auxiliary alternate voltage into an auxiliary power supply voltage VCC. The rectifying and smoothing circuit then supplies the resulting voltage VCC to the VCC terminal of the semiconductor device 100. That is, the rectifying and smoothing circuit is utilized as an auxiliary power supply section of the semiconductor device 100.

Two resistors 151 and 152 are connected to the auxiliary winding 113. The TR terminal of the semiconductor device 100 is connected to a junction point of the resistors 151 and 152. Thus, a divisional voltage (TR terminal voltage VTR) of the auxiliary alternate voltage is applied to the TR terminal. As described below, on the basis of the TR terminal voltage VTR, the semiconductor device 100 detects a timing (an off timing of secondary current) when a current (secondary current) stops flowing, the current starting to flow through the secondary winding 112 after the switching element 1 is turned off.

Now, the control circuit in the semiconductor device 100 will be described. The control circuit controls the switching operation of the switching element 1 so as to maintain the constant on duty ratio (the on duty of the secondary current) of an on period of the secondary current to a third period made up of a first period (an on period of the secondary current) during which the secondary current flows and a second period (an off period of the secondary current) during which the secondary current does not flow. The control circuit thus controllably maintains a constant output current from the switching power supply within a certain load range. The control circuit periodically modulates the on duty of the secondary current to reduce noise.

A drain current detecting circuit 2 connected to the DRAIN terminal detects the current value of a drain current ID flowing through the switching element 1 to generate a drain current detection signal VCL with a voltage value corresponding to the detected current value.

A drain current limiting circuit 3 compares a preset reference voltage (over-current protection reference voltage) VLIMIT with the voltage value of the drain current detection signal VCL. When the voltage value of the drain current detection signal VCL reaches the over-current protection reference voltage VLIMIT, the drain current limiting circuit 3 generates a reset signal that turns off the switching element 1. When the reset signal is input to a reset terminal R of a flip flop circuit 7 via an AND circuit 11, the flip flop circuit 7 is reset. When the flip flop circuit 7 is reset, the switching terminal 1 is turned off.

Thus, when the drain current ID reaches the set value determined by the over-current protection reference voltage VLIMIT, the drain current limiting circuit 3 generates a signal that turns off the switching element 1. Thus, a peak value of the drain current ID is kept constant at the set value determined by the over-current protection reference voltage VLIMIT.

A secondary current on period detecting circuit 4 connected to the TR terminal detects the on period of the secondary current on the basis of the TR terminal voltage VTR and a signal generated in the control circuit. The secondary current on period detecting circuit 4 generates a detection signal D2_ON indicative of the detected on period of the secondary current. Here, the detection signal D2_ON is a logic signal having a signal level that is high during the on period of the secondary current.

Specifically, the secondary current on period detecting circuit 4 detects a timing when the secondary current starts to flow (an on timing of the secondary current) on the basis of the signal generated in the control circuit. The secondary current on period detecting circuit 4 detects an off timing of the secondary current on the basis of the TR terminal voltage VTR.

That is, in the fly back switching power supply, during the on period of the switching element 1, a current flows through the primary winding 111 in the transformer 110 to accumulate energy in the transformer 110. During the off period of the switching element 1, the energy accumulated in the transformer 110 is emitted to allow a current (secondary current) to flow through the secondary winding 112 in the transformer 110. Subsequently, when the secondary current is zeroed, a resonance phenomenon is caused by the inductance of the transformer 110 and the parasitic capacitance of the switching element 1. The resonance phenomenon occurs in each of the windings in the transformer 110. In Embodiment 1, the secondary current on period detecting circuit 4 detects, as an off timing of the secondary current, the timing of a fall that appears first in the waveform of the auxiliary alternate voltage after the switching element 1 is turned off (the timing when a voltage polarity is inverted). Alternatively, the TR terminal may be connected to the primary winding 111 to detect the timing of the inversion of the voltage polarity which appears first in the primary winding.

Since the secondary current starts to flow after the switching element 1 is turned off, the secondary current on period detecting circuit 4 detects a timing when the switching element 1 is turned off, as an on timing of the secondary current. Here, the secondary current on period detecting circuit 4 detects a fall in a driving signal generated by a gate driver 9 described below.

On the basis of the detection signal D2_ON indicative of the on period of the secondary current, the secondary current on duty control circuit 5 oscillates a clock signal set that turns on the switching element 1 so as to maintain the on duty of the secondary current at a predetermined value (constant value). Every time the clock signal set rises, the flip flop circuit 7 is set. When the flip flop circuit 7 is set, the switching element 1 is turned on. Thus, the clock signal set determines the oscillation frequency of the switching element 1. The frequency of the clock signal set decreases with increasing current flowing through the load 130 and increasing secondary current on period.

A secondary current on duty modulating circuit 6 comprises a low frequency oscillator that oscillates at a frequency sufficiently lower than the oscillation frequency of the switching element 1. The secondary current on duty modulating circuit 6 generates and inputs a current signal Ijit (modulation signal) having the sufficiently lower frequency to the secondary current on duty control circuit 5. The current signal Ijit applies a low-frequency modulation component to the on duty of the secondary current, maintained at the predetermined value (constant value). Consequently, the current signal Ijit periodically modulates the on duty of the secondary current.

When the clock signal set input to a set terminal S, rises, the flip flop circuit 7 is set. When the reset signal is input to the reset terminal R via the AND circuit 11, the flip flop circuit 7 is reset. The flip flop circuit 7 generates an output signal (first logic signal) varying between a high signal level and a low signal level corresponding to the set and reset states. That is, an output signal from the flip flop circuit 7 is at the high level when the flip flop circuit 7 is in the set state, and is at the low level when the flip flop circuit 7 is in the reset state.

A NAND circuit 8 calculates the first logic signal from the flip flop circuit 7 and a second logic signal from a regulator 12 described below to generate an arithmetic signal indicative of the result of the calculation. As described below, the second logic signal from the regulator 12 is at the high level while the switching element 1 is performing a switching operation.

Consequently, the arithmetic signal generated by the NAND circuit 8 varies between the high signal level and the low signal level depending on the signal level of the first logic signal, that is, the state of the flip flop circuit 7. That is, the arithmetic signal is at the low level when the flip flop circuit 7 is in the set state, and is at the high level when the flip flop circuit 7 is in the reset state.

On the basis of the arithmetic signal from the NAND circuit 8, the gate driver 9 generates a driving signal that drives a control terminal (gate terminal) of the switching element 1. Specifically, when the arithmetic signal is set to the low level, the gate driver 9 sets the voltage of the driving signal to a first level to turn on the switching element 1. When the arithmetic signal is set to the high level, the gate driver 9 sets the voltage of the driving signal to a second level lower than the first level to turn off the switching element 1.

Thus, the control circuit varies the driving signal driving the gate terminal of the switching element 1, between a turn-on level (first level) at which the switching element 1 is turned on and a turn-off level (second level) at which the switching element 1 is turned off.

In accordance with the driving signal from the gate driver 9, the switching element 1 repeats a turn-on operation and a turn-off operation (switching operation) to perform switching control on the first DC voltage VIN input to the primary winding 111 in the transformer 110. This switching control generates the secondary alternate voltage on the secondary winding 112, while generating the auxiliary alternate voltage on the auxiliary winding 113.

In Embodiment 1, the flip flop circuit 7, the NAND circuit 8, and the gate driver 9 constitute the switching control circuit. The switching control circuit controls the switching operation (repeated on and off operations) of the switching element 1 according to the set/reset state of the flip flop circuit 7.

An on period blanking pulse generating circuit 10 maintains the signal input to the AND circuit 11 at the low signal level during a set period after a rise in the driving signal generated by the gate driver 9 (after the driving signal is set to the turn-on level). Thus, during the set period after the turn-on of the switching element 1, the flip flop circuit 7 is not reset in spite of the reset signal generated by the drain current limiting circuit 3. This prevents a possible erroneous detecting operation caused by a spike current during turn-on.

The regulator 12 supplies a current to an internal-circuit power source VDD for the semiconductor device 100 through one of the DRAIN terminal and VCC terminal, to stably maintain the voltage of the internal-circuit power source VDD at a constant value.

Specifically, before the start of the switching operation of the switching element 1, the regulator 12 supplies a current to the internal-circuit power source VDD though the DRAIN terminal to raise the voltage of the internal-circuit power source VDD. The regulator 12 further supplies a current to the capacitor 142 in the auxiliary power supply section via the VCC terminal to raise the auxiliary power supply voltage VCC. In the meantime, the regulator 12 sets the second logic signal input to the NAND circuit 8 to the low level to prevent the switching element 1 from being turned on.

When the voltage of the internal-circuit power source VDD reaches the constant value, the regulator 12 sets the second logic signal to the high signal level to allow the switching element 1 to perform the switching operation. Furthermore, when the voltage of the internal-circuit power source VDD rises, the secondary current on duty control circuit 5 generates a one pulse signal of the high signal level. The one pulse signal sets the flip flop circuit 7. Thus, when the voltage of the internal-circuit power source VDD reaches the constant value, the switching element 1 is turned on to start the switching element.

After the switching operation of the switching element 1 is started, the value of the auxiliary power supply voltage VCC determines a power supply terminal for the internal-circuit power source VDD. That is, when the auxiliary power supply voltage VCC reaches at least the constant value, the regulator 12 supplies a current to the internal-circuit power source VDD through the VCC terminal to reduce the power consumption of the semiconductor device 100. On the other hand, when the auxiliary power supply voltage VCC becomes lower than the constant value, the regulator 12 supplies a current to the internal-circuit power source VDD through the DRAIN terminal. The regulator 12 thus stably maintains the voltage of the internal-circuit power source VDD at the constant value.

Figure 2:
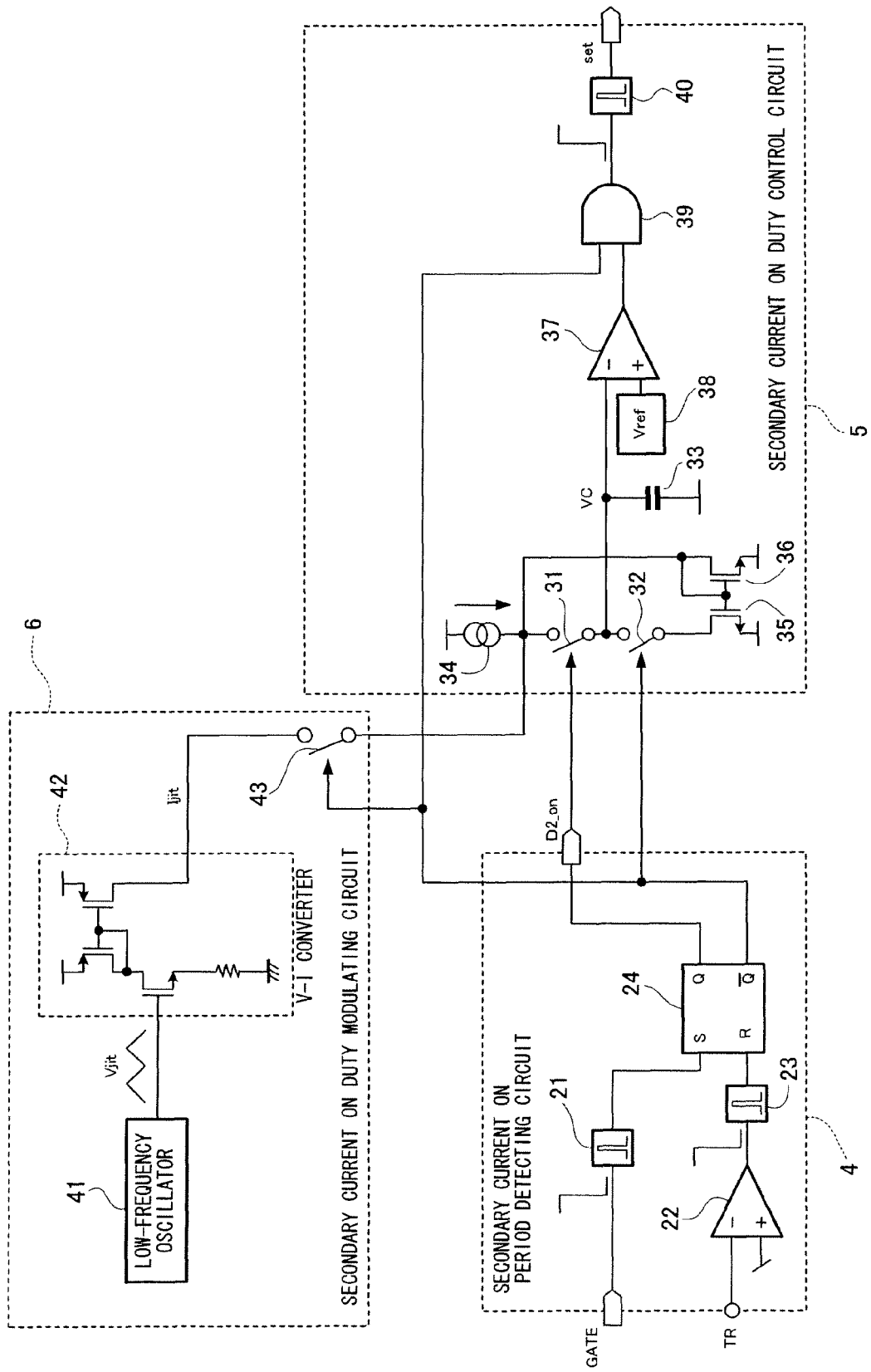
FIG. 2 is a block diagram showing an example of the configuration of a secondary current on period detecting circuit, a secondary current on duty control circuit, and a secondary current on duty modulating circuit constituting a part of a semiconductor device in the switching power supply according to Embodiment 1 of the present invention.

FIG. 2 is a block diagram showing an example of the configuration of the secondary current on period detecting circuit 4, the secondary current on duty control circuit 5, and the secondary current on duty modulating circuit 6, which constitute a part of the semiconductor device 100 of the switching power supply according to Embodiment 1 of the present invention.

The secondary current on period detecting circuit 4 is made up of one-pulse signal generating circuits 21 and 23, a comparator 22, and a flip flop circuit 24. These elements are connected together as shown in FIG. 2.

The driving signal generated by the gate driver 9 is input to the one-pulse signal generating circuit 21. The one-pulse signal generating circuit 21 generates a one-pulse signal when the circuit detects a fall in the driving signal from the gate driver 9, that is, a timing when the switching element 1 is turned off. The one-pulse signal generating circuit 21 inputs the one-pulse signal to the set terminal of the flip flop circuit 24 to set the flip flop circuit 24.

The comparator 22 compares the TR terminal voltage VTR with a preset reference voltage to detect an off timing of the secondary current. When the comparator 22 detects the off timing of the secondary current, the one-pulse signal generating circuit 23 generates a one-pulse signal and inputs the one-pulse signal to the reset terminal of the flip flop circuit 24 to reset the flip flop circuit 24. Consequently, at the off timing of the secondary current, the signal levels of an output signal and an inverse output signal from the flip flop circuit 24 are inverted.

With the above-described configuration, during a period from the turn-off of the switching element 1 until the end of the flow of the secondary current, that is, during the on period of the secondary current, the output signal (detection signal) D2_ON from the flip flop circuit 24 is at the high signal level, and the inverse output signal is at the low signal level. Then, at the off timing of the secondary current, the signal levels of the output signal D2_ON and the inverse output signal are inverted. During a period from the off timing of the secondary current until the turn-off of the switching element 1, that is, during the off period of the secondary current, the output signal D2-ON from the flip flop circuit 24 is at the low signal level, and the inverse output signal is at the high signal level.

The secondary current on duty control circuit 5 is made up of switches 31 and 32, a capacitor (capacitance) 33, a constant current source 34, NchMOSFETs 35 and 36, a comparator (comparison circuit) 37, a reference voltage source 38, an AND circuit 39, and a one-pulse signal generating circuit 40. These elements are connected together as shown in FIG. 2.

The switch 31 is turned on when the output signal D2-ON from the flip flop circuit 24 in the secondary current on period detecting circuit 4 is set to the high signal level, and is turned off when the output signal D2-ON is set to the low signal level. The switch 32 is turned on when the inverse output signal from the flip flop circuit 24 in the secondary current on period detecting circuit 4 is set to the high signal level, and is turned off when the inverse output signal is set to the low signal level. Thus, a charging and discharging circuit made up of the switches 31 and 32 is turned on and off in synchronism with the on and off periods of the secondary current to charge and discharge the capacitor 33.

That is, when the switching element 1 is turned off to allow the secondary current to start flowing, the output signal D2_ON is set to the high signal level, and the inverse output signal is set to the low signal level. Thus, the switch 31 is turned on, and the switch 32 is turned off. The capacitor 33 is then charged with a constant current from the constant current source 34. This raises the voltage VC of the capacitor 33.

On the other hand, when the secondary current stops flowing, the output signal D2-ON is set to the low signal level, and the inverse output signal is set to the high signal level. Thus, the switch 31 is turned off, and the switch 32 is turned on. The capacitor 33 is then discharged to reduce the voltage VC of the capacitor 33. The discharge current in this case is determined by the constant current from the constant current source 34 and a current mirror circuit made up of the NchMOSFETs 35 and 36.

The comparator 37 generates a signal that turns on the switching element 1, when the reduced voltage VC of the capacitor 33 is detected on the basis of a reference voltage (set voltage) Vref generated by the reference voltage source 38. The one-pulse signal generating circuit 40 generates a one-pulse signal when the signal generated by the comparator 37 to turn on the switching element 1 is input to the one-pulse signal generating circuit 40 via the AND circuit 39. The one-pulse signal corresponds to the clock signal set. The AND circuit 39 allows the input, to the one-pulse signal generating circuit 40, of the signal generated by the comparator 37 to turn on the switching element 1, only while the inverse output signal from the flip flop circuit 24 in the secondary current on period detecting circuit 4 is at the high level, that is, during the off period of the secondary current. Consequently, the one-pulse signal generating circuit 40 generates the one-pulse signal (clock signal set) only during the off period of the secondary current.

As described above, the secondary current on duty control circuit 5 charges the capacitor 33 during the on period of the secondary current and discharges the capacitor 33 when the off period of the secondary current starts. Upon detecting the voltage VC of the capacitor 33 on the basis of the reference voltage Vref, the secondary current on duty control circuit 5 turns on the switching element 1. Even after the switching element 1 is turned on, the secondary current on duty control circuit 5 continues discharging the capacitor 33 until the peak value of the drain current ID reaches the constant value to turn off the switching element.

With the above-described configuration, the secondary current on duty control circuit 5 oscillates the clock signal (one-pulse signal) set that turns on the switching element 1 so as to maintain the on duty of the secondary current at a predetermined value.

That is, when a variation occurs in the magnitude of the load 130 and thus in the on period of the secondary current, the maximum value of the voltage VC of the capacitor 33 varies correspondingly. Thus, the off period of the secondary current also varies. For example, the increased on period of the secondary current increases the maximum value of the voltage VC of the capacitor 33 and thus the time required to detect the voltage VC, starting to decrease at the off timing of the secondary current, on the basis of the reference voltage Vref. As a result, the off period of the secondary current increases to maintain the constant on duty of the secondary current.

The secondary current on duty modulating circuit 6 is made up of a low-frequency oscillator 41, a V-I converter 42, and a switch 43. These elements are connected together as shown in FIG. 2.

The low-frequency oscillator 41 oscillates a voltage signal Vjit with a frequency of about 100 Hz to several kHz, which is sufficiently lower than the oscillation frequency of the switching element 1. The V-I converter 42 converts the voltage signal Vjit into a current signal Ijit. Thus, the frequency of the current signal (modulation signal) Ijit is sufficiently lower than the oscillation frequency of the switching element 1.

The switch 43 is turned on and off in response to the inverse output signal from the flip flop circuit 24 in the secondary current on period detecting circuit 4. That is, the switch 43 is on during the off period of the secondary current when the inverse output signal is at the high signal level. When the switch 43 is turned on, the current signal Ijit is superimposed on the constant current generated by the constant current source 34 in the secondary current on duty control circuit 5. Consequently, the modulation component is applied only to the discharge current from the capacitor 33.

With the above-described configuration, the secondary current on duty modulating circuit 6 periodically modulates the discharge time of the capacitor 33, that is, the off period of the secondary current, and thus the on duty of the secondary current to apply the modulation component to the oscillation frequency of the switching element 1.

For example, if the current mirror circuit made up of the NchMOSFETs 35 and 36 has a mirror ratio of 1 and the current signal Ijit varies the discharge current from the capacitor 33 from 100% to 120% of the charge current, the on duty of the secondary current varies between 45.5% and 50%. This variation is periodically repeated at a period (modulation period) set by the low-frequency oscillator 41.

The current signal Ijit may be superimposed only on the charge current from the capacitor 33. In this case, a periodical variation occurs in the amount of time for charging the capacitor 33, that is, the on period of the secondary current, and thus in the on duty of the secondary current.

As described above, the control circuit maintains the constant peak value of the drain current ID at a set value determined by the over-current protection reference voltage VLIMIT. The control circuit also controls the switching operation of the switching element 1 so that the on duty of the secondary current, which starts flowing through the secondary winding 112 in the transformer 110 after the switching element 1 is turned off, is maintained at the predetermined value (constant value). The control circuit thus controllably maintains the constant output current within the certain load range. The control circuit also uses the current signal (modulation signal) Ijit to modulate the on duty of the secondary current to apply the modulation component to the oscillation frequency of the switching element 1. The control circuit thus reduces noise.

Furthermore, since the modulation component is applied to the on duty of the secondary component, even with a variation in secondary load and thus in the oscillation frequency of the switching element 1, the modulation range of the on duty of the secondary current varies depending on the variation in the oscillation frequency. This prevents the modulation range from increasing excessively with respect to the oscillation frequency of the switching element 1 to affect the accuracy of constant current control or from decreasing excessively to eliminate the noise reducing effect.

Furthermore, the switching element 1 and the control circuit thereof are formed on the same semiconductor substrate to provide an integrated circuit. This enables a reduction in the number of components required to construct the switching power supply. The size and weight of the switching power supply and the costs thereof can thus be easily reduced.

Now, description will be given of another example of the switching power supply according to Embodiment 1 of the present invention. Instead of superimposing the current signal (modulation signal) Ijit, generated by the secondary current on duty modulating circuit 6, on the constant current generated by the constant current source 34 in the secondary current on duty control circuit 5, the switching power supply inputs the current signal Ijit to the reference voltage source 38 in the secondary current on duty control circuit 5. The switching power supply thus applies the modulation component to the reference voltage (set voltage) Vref to modulate the off period of the secondary current and thus the on duty of the secondary current.

Figure 3:
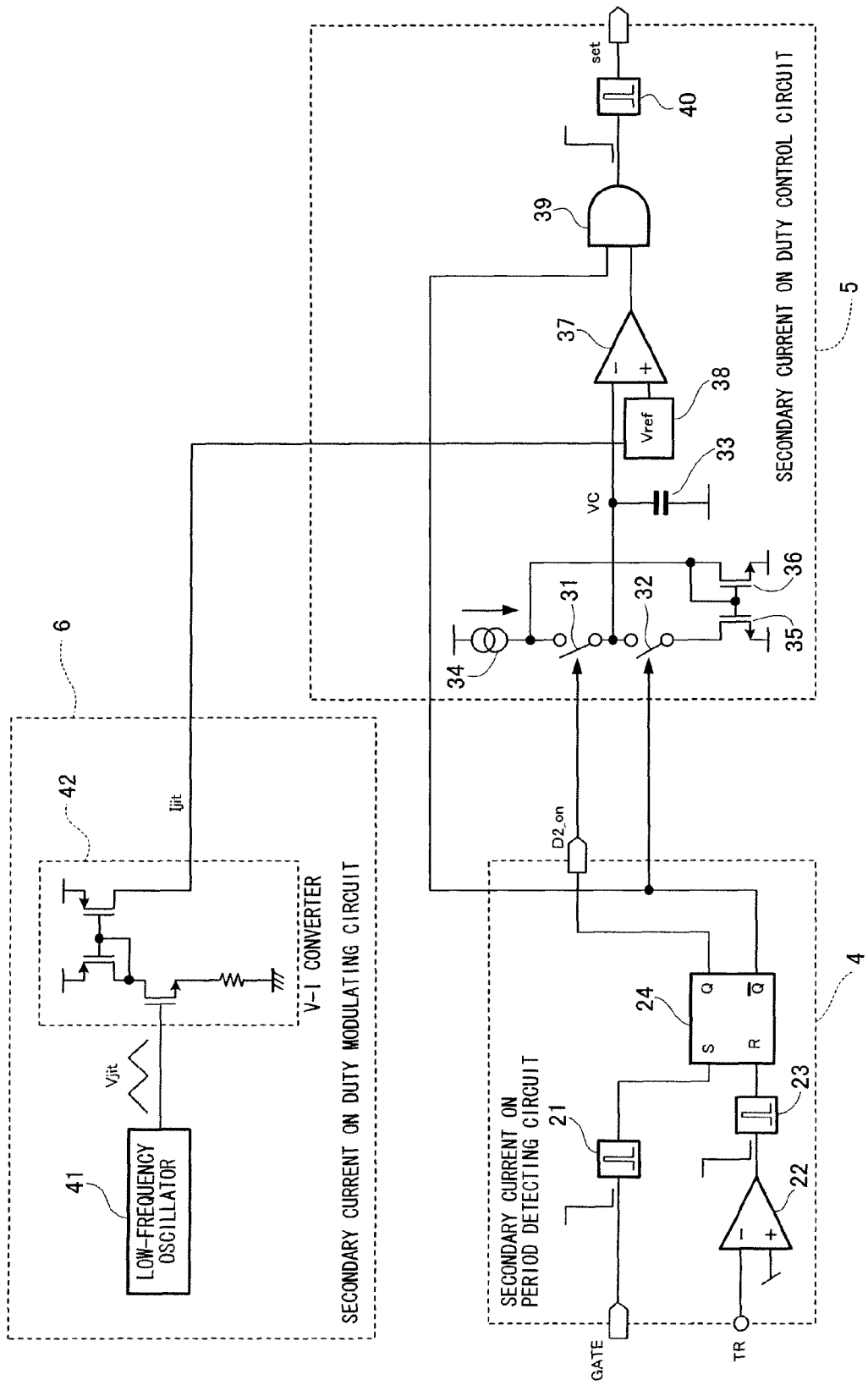
FIG. 3 is a block diagram showing an example of the configuration of the secondary current on period detecting circuit, the secondary current on duty control circuit, and the secondary current on duty modulating circuit constituting a part of the semiconductor device in another example of the switching power supply according to Embodiment 1 of the present invention.

FIG. 3 shows an example of the configuration of the secondary current on period detecting circuit 4, the secondary current on duty control circuit 5, and the secondary current on duty modulating circuit 6, which constitute a part of the semiconductor device 100 in another example of the switching power supply according to Embodiment 1 of the present invention.

As shown in FIG. 3, the switching power supply inputs the current signal Ijit to the reference voltage source 38 in the secondary current on duty control circuit 5 to apply a low-frequency modulation component to the reference voltage Vref to modulate the off period of the secondary current. Thus, the on duty of the secondary current, which is maintained at the predetermined value, has the low-frequency modulation component. The modulation component is applied to the oscillation frequency of the switching element 1.

Embodiment 2

A switching power supply according to Embodiment 2 of the present invention will be described with reference to the drawings. The same members as those described above in Embodiment 1 are denoted by the same reference numerals and the description thereof is appropriately omitted.

Figure 4:
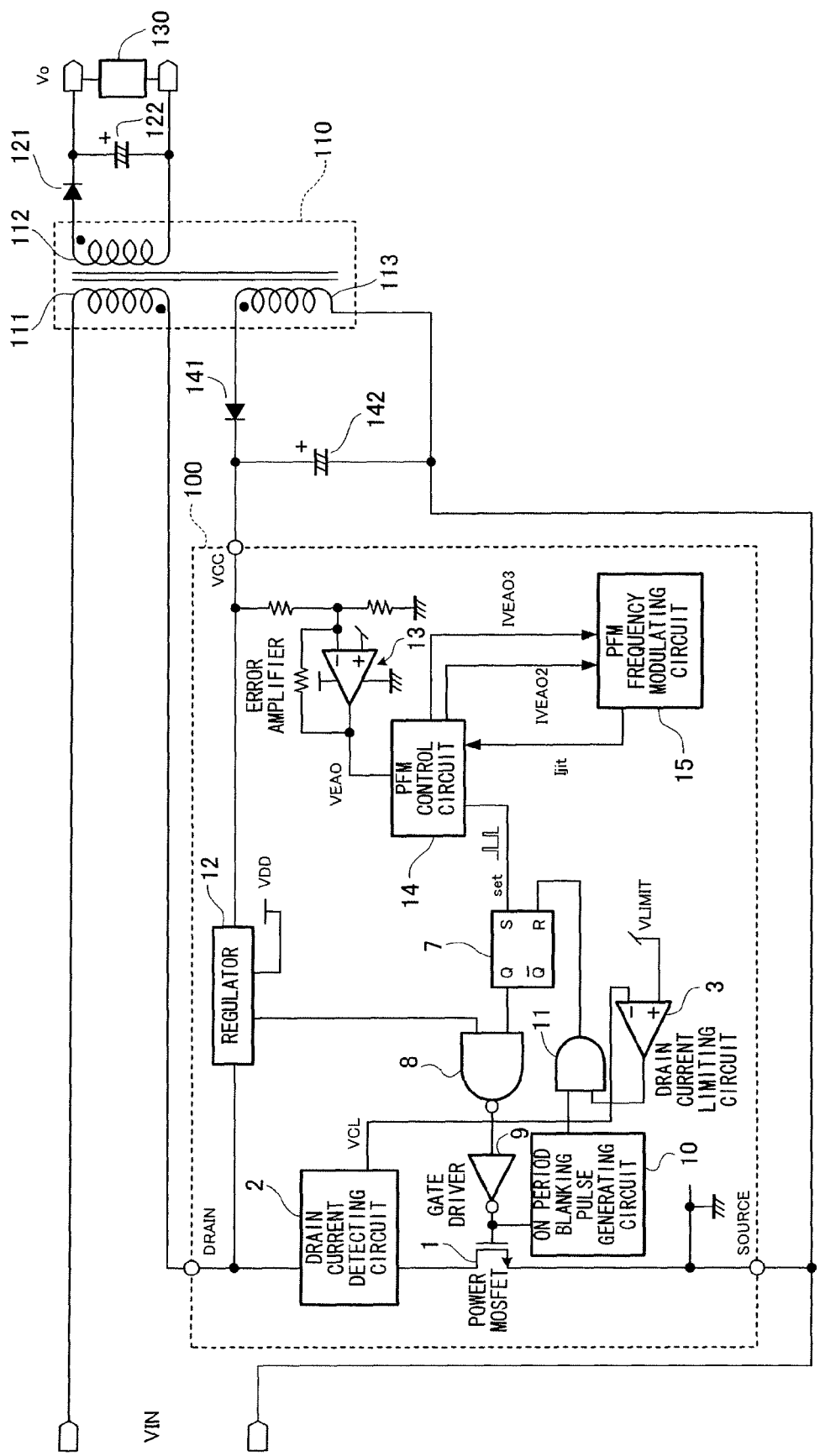
FIG. 4 is a block diagram showing an example of the configuration of a switching power supply according to Embodiment 2 of the present invention.

FIG. 4 is a block diagram showing an example of the configuration of the switching power supply according to Embodiment 2 of the present invention. The switching power supply comprises a constant voltage control function based on PFM control. However, the switching power supply comprises no constant current control function.

As shown in FIG. 4, in Embodiment 2, a semiconductor device 100 comprises three terminals, an input terminal (DRAIN terminal (first terminal)) of a switching element 1, an auxiliary power supply voltage input terminal (VCC terminal (third terminal)), and a GND terminal (SOURCE terminal (second terminal)) of a control circuit which also serves as the output terminal of the switching element 1, as external input terminals.

Only a rectifying and smoothing circuit made up of a diode 141 and a capacitor 142 is connected to an auxiliary winding 113. The rectifying and smoothing circuit is utilized as an auxiliary power supply section and an output voltage detecting section of the semiconductor device 100.

Now, the control circuit in the semiconductor device 100 will be described. The control circuit controls the switching operation of the switching element 1 by means of PFM control to controllably maintain the constant output voltage of the switching power supply. The control circuit periodically modulates the frequency of a clock signal set, which determines the oscillation frequency of the switching element 1, to reduce noise.

An auxiliary power supply voltage VCC input to the VCC terminal is proportional to a second DC voltage Vo to be supplied to a load 130. An error amplifier 13 compares the auxiliary power supply voltage VCC with a stabilizing reference voltage to generate an error voltage signal VEAO on the basis of the difference between the auxiliary power supply voltage VCC and the stabilizing reference voltage. Specifically, when the magnitude of the load 130 increases and the output voltage Vo decreases, the signal level (voltage) of the error voltage signal VEAO increases. In contrast, when the magnitude of the load 130 decreases and the output voltage Vo increases, the signal level (voltage) of the error voltage signal VEAO decreases.

A PFM control circuit 14 internally comprises an oscillator. The oscillator oscillates the clock signal set, which turns on the switching element 1. The PFM control circuit 14 varies the frequency of the clock signal set depending on the error voltage signal VEAO (output voltage Vo) so as to maintain the output voltage Vo at a constant value. Specifically, the PFM control circuit 14 increases the frequency of the clock signal set when the level of the error voltage signal VEAO increases. The PFM control circuit 14 reduces the frequency of the clock signal set when the level of the error voltage signal VEAO decreases. The clock signal set controls the timing of the turn-on of the switching element 1. The output voltage Vo of the switching power supply is kept constant by the function of varying the frequency of the clock signal set depending on the error voltage signal VEAO (output voltage Vo).

A PFM frequency modulating circuit 15 comprises a low-frequency oscillator that oscillates at a frequency sufficiently lower than the oscillation frequency (the frequency of the clock signal set) of the switching element 1. The PFM frequency modulating circuit 15 thus generates and inputs a current signal (modulation signal) Ijit having the sufficiently lower frequency, to the PFM control circuit 14. The current signal Ijit periodically modulates the frequency of the clock signal set. That is, the low-frequency modulation component is applied to the frequency of the clock signal set, which varies with the magnitude of the load.

Figure 5:
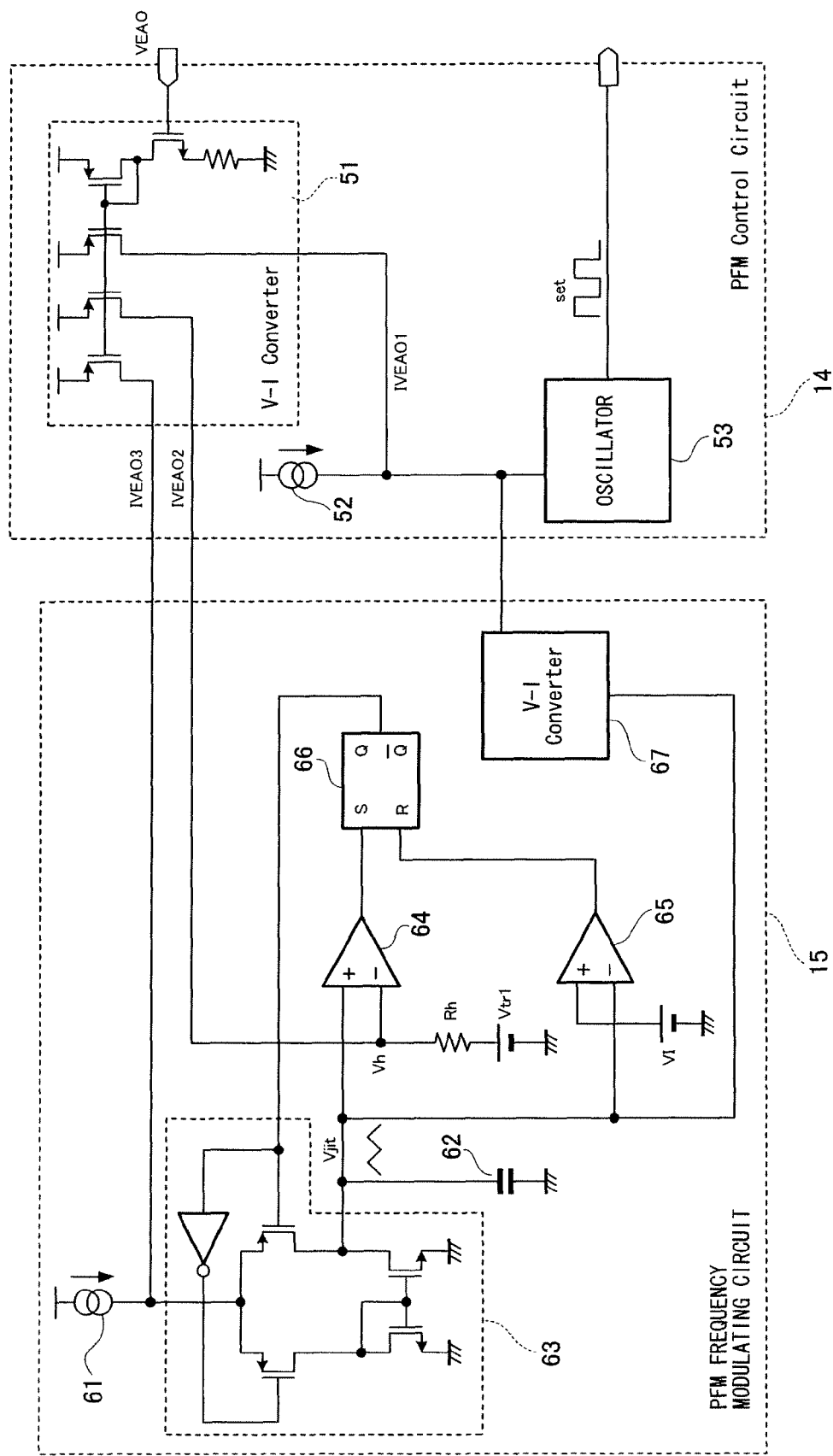
FIG. 5 is a block diagram showing an example of the configuration of a PFM control circuit and a PFM frequency modulating circuit constituting a part of a semiconductor device in the switching power supply according to Embodiment 2 of the present invention.

FIG. 5 is a block diagram showing an example of the configuration of the PFM control circuit 14 and the PFM frequency modulating circuit 15, which constitute a part of the semiconductor device 100 in the switching power supply according to Embodiment 2 of the present invention.

The PFM control circuit 14 is made up of a V-I converter 51, a constant current source 52, and an oscillator 53. These elements are connected together as shown in FIG. 5.

The V-I converter 51 converts the error voltage signal VEAO into current signals IVEAO1, IVEAO2, and IVEAO3.

The current signal IVEAO1 is superimposed on a constant current generated by the constant current source 52. A current signal obtained by superimposing the current signal IVEA01 on the constant current generated by the constant current source 52 is input, as a PFM control signal, to the oscillator 53 that oscillates the clock signal set. The oscillator 53 oscillates at a frequency corresponding to the current value of the PFM control signal. Thus, since the frequency of the clock signal set varies with the magnitude of the load 130, the output voltage Vo of the switching power supply is kept constant.

The PFM frequency modulating circuit 15 is made up of a constant current source 61, a capacitor 62, a charging and discharging control circuit 63 that controls the charging and discharging of the capacitor 62, comparators 64 and 65, a flip flop circuit 66 connected to the charging and discharging control circuit 63, and a V-I converter 67. These elements are connected together as shown in FIG. 5.

The current signal IVEAO2, generated by the V-I converter 51 in the PFM control circuit 14, is supplied to a resistor Rh. The resistor Rh and a voltage source Vtr1 generate a reference voltage Vh. That is, the reference voltage Vh is as follows:

$$Vh = Rh \times IVEAO2 + Vtr1$$

The current signal IVEAO3, generated by the V-I converter 51 in the PFM control circuit 14, is superimposed on a constant current generated by the constant current source 61. A current signal obtained by superimposing the current signal IVEAO3 on the constant current generated by the constant current source 61 is input to the charging and discharging control circuit 63. The current signal corresponds to a charging and discharging current for the capacitor 62.

The charging and discharging control circuit 63 charges and discharges the capacitor 62 depending on the condition of the flip flop circuit 66. That is, when the flip flop circuit 66 is set and the output signal from the flip flop circuit 66 is set to a high signal level, the charging and discharging control circuit 63 discharges the capacitor 62 to reduce the voltage Vjit of the capacitor 62. On the other hand, when the flip flop circuit 66 is reset and the output signal from the flip flop circuit 66 is set to a low signal level, the charging and discharging control circuit 63 charges the capacitor 62 to raise the voltage Vjit of the capacitor 62.

Upon detecting the rising voltage Vjit of the capacitor 62 on the basis of the reference voltage Vh, the comparator 64 sets the flip flop circuit 66. This starts discharging the capacitor 62. On the other hand, upon detecting the decreasing voltage Vjit of the capacitor 62 on the basis of a reference voltage Vl, the comparator 65 resets the flip flop circuit 66. This starts charging the capacitor 62. Consequently, the voltage Vjit of the capacitor 62 is a voltage signal of a triangular wave having the voltages Vh and Vl as an upper limit and a lower limit, respectively.

As described above, the constant current source 61, the capacitor 62, the charging and discharging control circuit 63, the comparators 64 and 65, and the flip flop circuit 66 constitute a low-frequency oscillator. The low-frequency oscillator oscillates the voltage signal Vjit of a frequency sufficiently lower than the oscillation frequency (the frequency of the clock signal set) of the oscillator 53 in the PFM control circuit 14.

The V-I converter 67 converts the voltage signal Vjit into the current signal Ijit. Thus, the frequency of the current signal Ijit is sufficiently lower than that (the oscillation frequency of the switching element 1) of the clock signal set.

The current signal Ijit is superimposed on the PFM control signal, generated in the PFM control circuit 14, to apply a minor modulation component to the frequency of the clock signal set. Consequently, the frequency of the clock signal set is periodically modulated, enabling a reduction in noise.

Furthermore, in Embodiment 2, depending on the magnitude of the load 130 and the output voltage Vo (error voltage signal VEAO), a variation occurs in the charge current into and the discharge current from the capacitor 62 and in the reference voltage Vh determining the upper limit of the voltage signal Vjit. With this configuration, a variation in the magnitude of the load 130 and thus in the oscillation frequency fosc of the switching element 1 varies the modulation range (frequency modulation range Δfosc) of the frequency of the clock signal set.

Thus, appropriate setting the ratio of the current signals IVEAO1, IVEAO2, and IVEAO3 makes it possible to hold the appropriate frequency modulation range Δfosc for the accuracy of the constant voltage control and the effect of a noise reduction. That is, the appropriate setting of the ratio makes it possible to prevent the frequency modulation range Δfosc from increasing excessively with respect to a variation in the oscillation frequency fosc of the switching element 1 to affect the accuracy of constant voltage control or from decreasing excessively to eliminate the noise reducing effect.

Figure 6A:
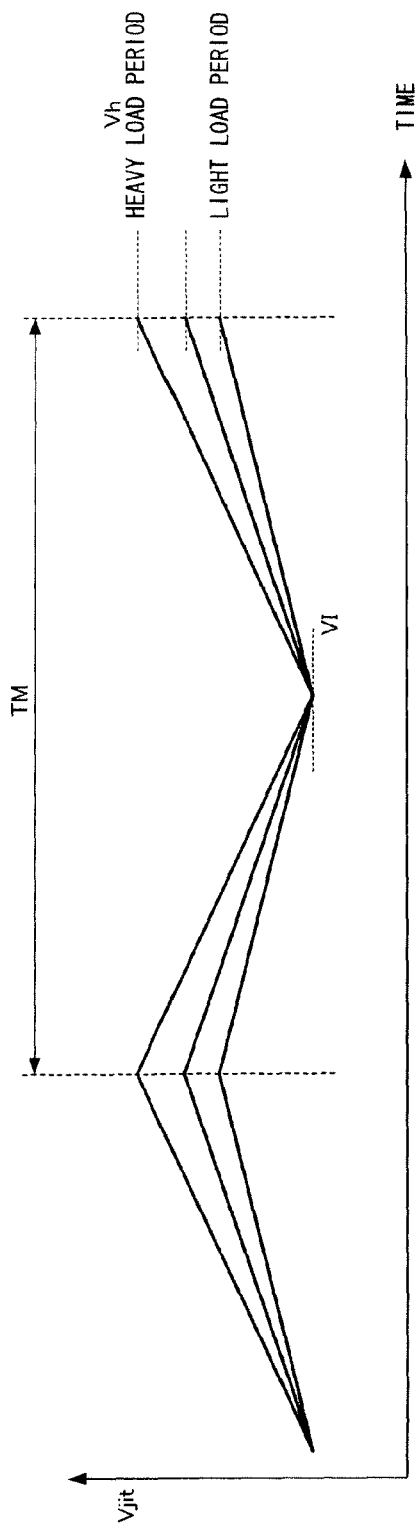
FIG. 6A is a schematic diagram showing an example of a voltage signal Vjit generated in the PFM frequency modulating circuit in the switching power supply according to Embodiment 2 of the present invention.
Figure 6B:
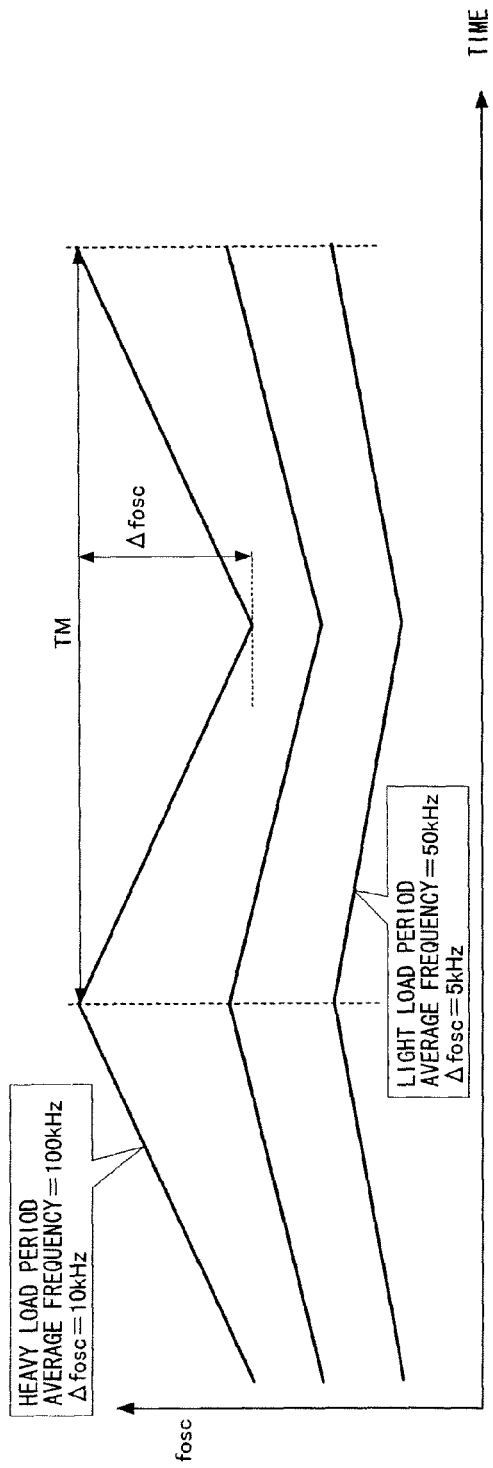
FIG. 6B is a schematic diagram showing an example of an oscillation frequency fosc of a switching element in the switching power supply according to Embodiment 2 of the present invention.

FIG. 6A shows the voltage signal Vjit, generated in the PFM frequency modulating circuit 15 in the switching power supply according to Embodiment 2. FIG. 6B shows an example of the oscillation frequency fosc of the switching element 1 in the switching power supply according to Embodiment 2.

The appropriate frequency modulation range Δfosc for the accuracy of the constant voltage control and the effect of a noise reduction can be held by setting the ratio of the current signals IVEAO1, IVEAO2, and IVEAO3 so that, for example, the period (modulation period) TM of the voltage signal Vjit is kept constant in spite of a variation in the magnitude of the load, with the upper limit Vh of the voltage signal Vjit increasing consistently with the magnitude of the load, as shown in FIG. 6A, and so that the frequency modulation range Δfosc is 10 kHz during a heavy load period when the switching element 1 has an average frequency of 100 kHz, and is 5 kHz during a light load period when the switching element 1 has an average frequency of 50 kHz, as shown in FIG. 6B.

FIG. 6A shows that the modulation period TM is fixed. However, a change in the ratio of the current signals IVEAO1, IVEAO2, and IVEAO3 allows the modulation period TM to be varied so as to deal with a variation in the magnitude of the load, that is, a variation in the signal level of the error voltage signal VEAO (output voltage Vo). Similarly, FIG. 6B shows that the frequency modulation range Δfosc varies. However, the frequency modulation range Δfosc can be fixed by changing the ratio of the current signals IVEAO1, IVEAO2, and IVEAO3.

Furthermore, as is the case with Embodiment 1, described above, by forming the switching element 1 and the control circuit therefor on the same semiconductor substrate to construct an integrated circuit, it is possible to reduce the number of components constituting the switching power supply. This enables an easy reduction in the size and costs of the switching power supply.

Embodiment 3

With reference to the drawings, description will be given of a switching power supply according to Embodiment 3 of the present invention. However, the same members as those described above in Embodiments 1 and 2 are denoted by the same reference numerals and the description thereof is appropriately omitted.

Figure 7:
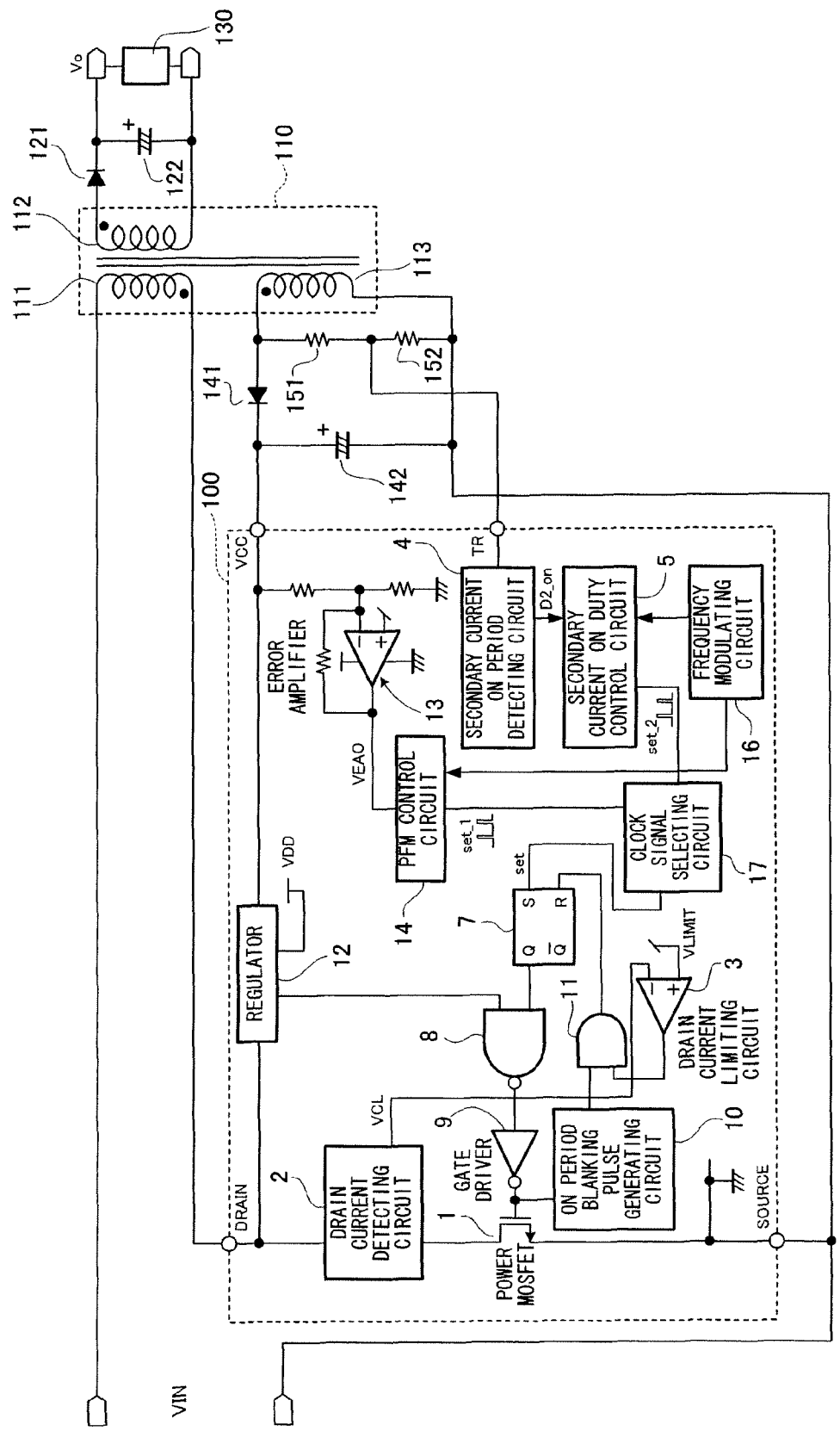
FIG. 7 is a block diagram showing an example of the configuration of a switching power supply according to Embodiment 3 of the present invention.

FIG. 7 is a block diagram showing an example of the configuration of the switching power supply according to Embodiment 3 of the present invention. The switching power supply is a combination of Embodiments 1 and 2, described above. The switching power supply comprises a constant current control function of controllably maintaining a constant output current within a certain load range and a constant voltage control function based on PFM control.

As shown in FIG. 7, in Embodiment 3, a semiconductor device 100 comprises four terminals, an input terminal (DRAIN terminal (first terminal)) of a switching element 1, an auxiliary power supply voltage input terminal (VCC terminal (third terminal)), a secondary current off timing detecting terminal (TR terminal (fourth terminal)), and a GND terminal (SOURCE terminal (second terminal)) of a control circuit which also serves as the output terminal of the switching element 1, as external input terminals.

A frequency modulating circuit 16 in the semiconductor device 100 generates a first current signal (first modulation signal) Ijit_1 that applies a modulation component to the frequency of a first clock signal set_1 oscillated in a PFM control circuit 14, and a second current signal (second modulation signal) Ijit_2 that applies a modulation component to the on duty of a secondary current. The frequency of the first clock signal set_1 is periodically modulated by the modulation component applied by the first current signal Ijit_1. The secondary current on duty is periodically modulated by the modulation component applied by the second current signal Ijit_2.

The configuration of the frequency modulating circuit 16 corresponds to the secondary current on duty modulating circuit 6 shown in FIG. 3 and in which a V-I converter 42 is composed of two mirror circuits connected together in parallel. This configuration makes it possible to set a modulation range appropriate for each of the frequency of the first clock signal set_1 and the secondary current on duty by adjusting the mirror ratio of the two mirror circuits constituting the V-I converter 42.

A clock signal selecting circuit 17 selects one having a lower frequency, that is, a longer period out of the first and second clock signals set_1 and set_2; the first clock signal set_1 is oscillated by the PFM control circuit 14, and the second clock signal set_2 is oscillated by the secondary current on duty control circuit 5. The clock signal selecting circuit 17 then inputs the selected signal to the set terminal of a flip flop circuit 7.

Figure 8:
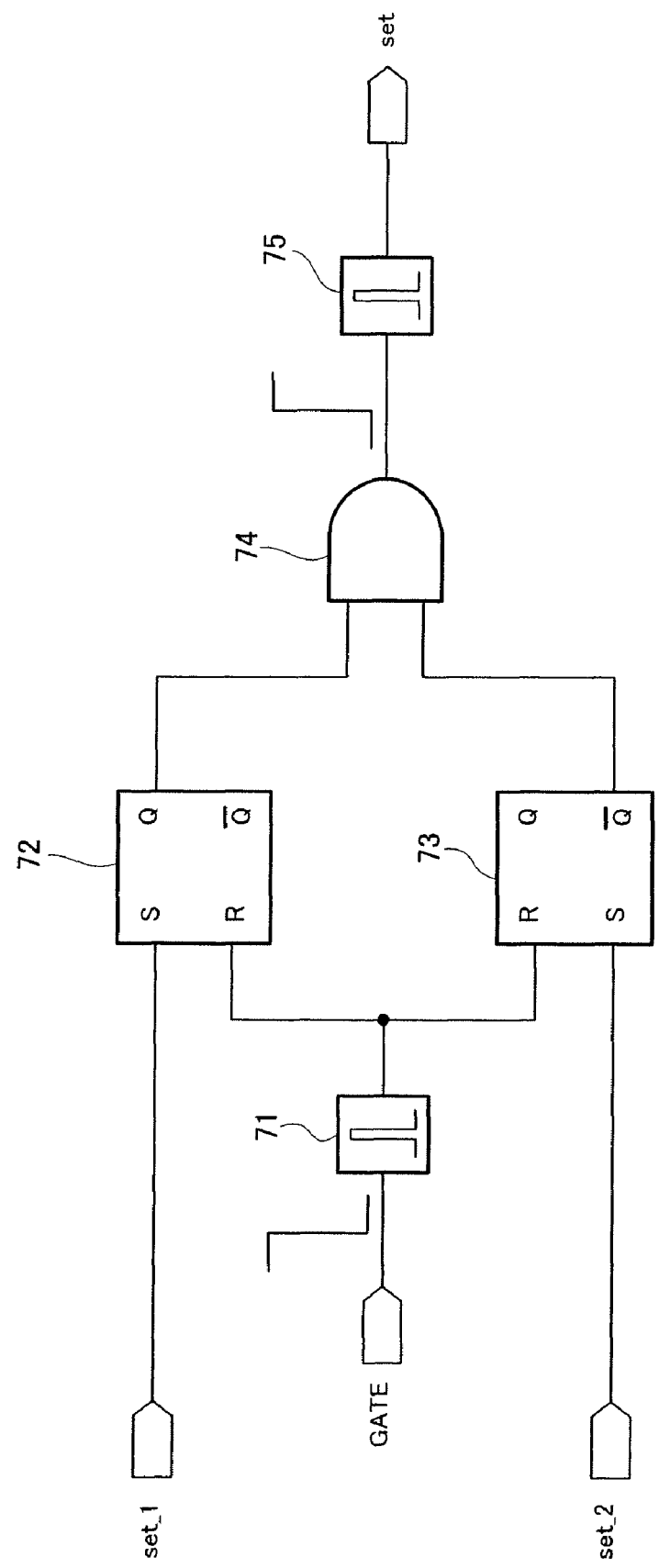
FIG. 8 is a block diagram showing an example of the configuration of a clock signal selecting circuit constituting a part of a semiconductor device in the switching power supply according to Embodiment 3 of the present invention.

FIG. 8 shows an example of the configuration of the clock signal selecting circuit 17. The clock signal selecting circuit 17 is made up of one-pulse signal generating circuits 71 and 75, flip flop circuits 72 and 73, and an AND circuit 74. These elements are connected together as shown in FIG. 8.

A driving signal generated by a gate driver 9 is input to the one-pulse signal generating circuit 71. The one-pulse signal generating circuit 71 generates a one-pulse signal when the circuit detects a fall in the driving signal generated by the gate driver 9, that is, a timing when the switching element 1 is turned off. The one-pulse signal generating circuit 71 inputs the one-pulse signal to each of the reset terminals of the flip flop circuits 72 and 73. The flip flop circuits 72 and 73 are reset when the one-pulse signal generating circuit 71 generates the one-pulse signal.

The clock signal set_1 from the PFM control circuit 14 is input to the set terminal of the flip flop circuit 72. The clock signal set_2 from the secondary current on duty control circuit 5 is input to the set terminal of the flip flop circuit 73.

Output signals from the flip flop circuits 72 and 73 are input to the AND circuit 74. The AND circuit 74 allows the one-pulse signal generating circuit 75 to generate a one-pulse signal when both the output signals from the flip flop circuits 72 and 73 are set to a high level. The one-pulse signal generated by the one-pulse signal generating circuit 75 corresponds to a clock signal set and determines the oscillation frequency of the switching element 1.

Thus, for a constant voltage region in which the on duty of the secondary current has not reached a constant value, the clock signal selecting circuit 17 selects the first clock signal set_1 because in this region, the frequency of the first clock signal set_1 is lower than that of the second clock signal set_2. On the other hand, for a constant current region in which the on duty of the secondary current has reached the constant value, the clock signal selecting circuit 17 selects the second clock signal set_2 because in this region, the frequency of the second clock signal set_2 is lower than that of the first clock signal set_1.

Thus, Embodiment 3 allows the primary side to perform not only the constant voltage control but also the constant current control. Furthermore, for each control region, the modulation component can be applied to the oscillation frequency of the switching element to inhibit possible noise. Consequently, a switching power source for a charger can be constructed which offers a constant voltage characteristic, a constant current characteristic, and a low noise characteristic.

Furthermore, as is the case with Embodiment 1, described above, by forming the switching element 1 and the control circuit therefor on the same semiconductor substrate to construct an integrated circuit, it is possible to reduce the number of components constituting the switching power supply. This enables an easy reduction in the size and costs of the switching power supply.

Embodiment 4

With reference to the drawings, description will be given of a switching power supply according to Embodiment 4 of the present invention. However, the same members as those described above in Embodiments 1 to 3 are denoted by the same reference numerals and the description thereof is appropriately omitted.

Figure 9:
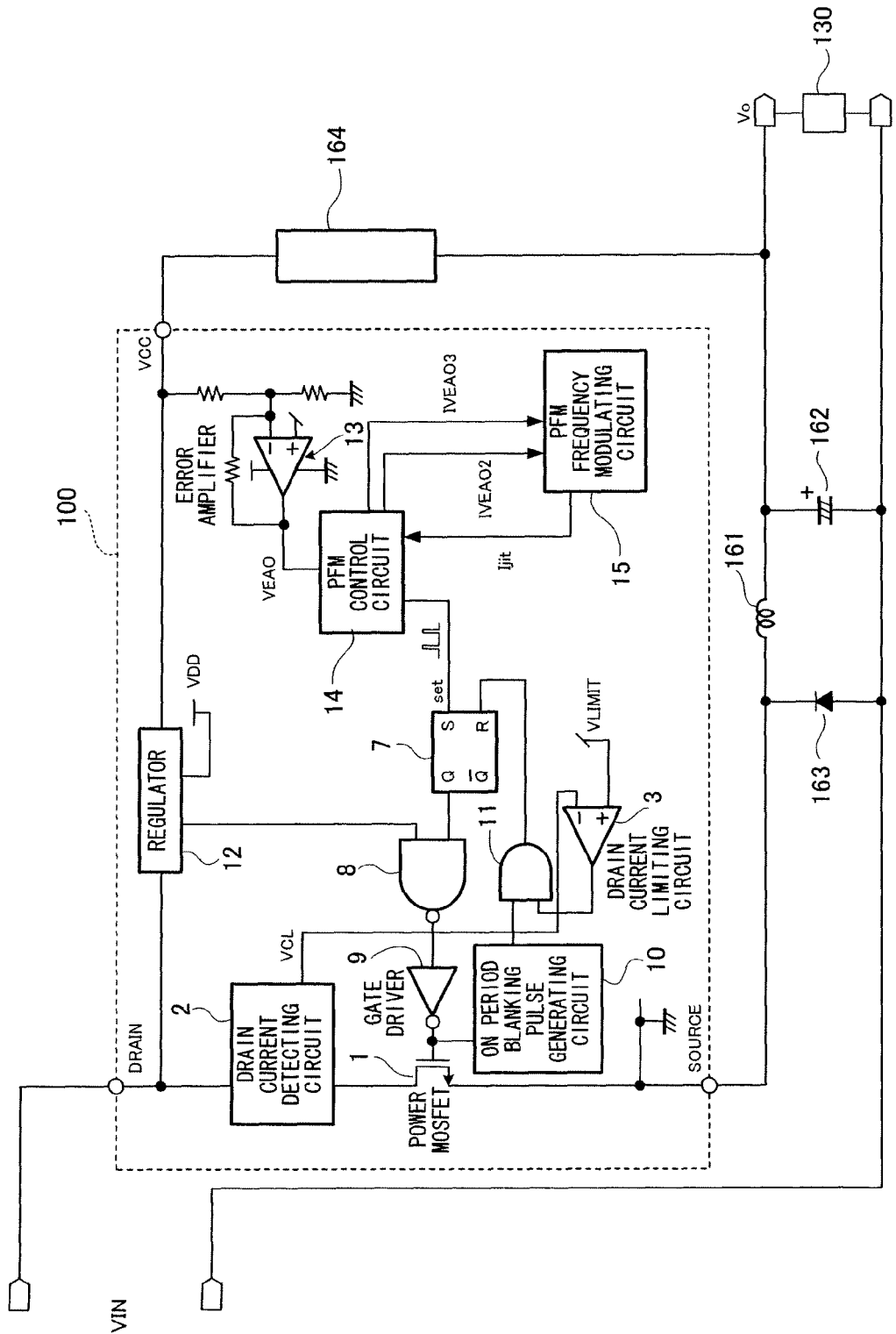
FIG. 9 is a block diagram showing an example of the configuration of a switching power supply according to Embodiment 4 of the present invention.

FIG. 9 is a block diagram showing an example of the configuration of the switching power supply according to Embodiment 4 of the present invention. In FIG. 9, a semiconductor device (regulation circuit) 100 for controlling the switching power source is the same as the semiconductor device 100 described above in Embodiment 2, and comprises the constant voltage control function based on PFM control and the function of modulating the oscillation frequency of a switching element.

The switching power supply constitutes a voltage-drop type chopper power source, and converts a first DC voltage (input voltage) VIN into a second DC voltage (output voltage) Vo, which is lower than the first DC voltage.

That is, the first DC voltage VIN is input directly to a DRAIN terminal of the semiconductor device 100. The control circuit in the semiconductor device 100 controls the switching operation of a switching element 1 to perform switching control on the first DC voltage VIN. The switching control generates a square wave voltage at a SOURCE terminal. A filter (output voltage generating section) made up of a choke winding 161 and an output smoothing capacitor 162 averages the square wave voltage generated at the SOURCE terminal. The averaged voltage corresponds to the output voltage Vo. During the off period of the switching element 1, a free wheel diode 163 emits energy accumulated in the choke winding 161 during the on period of the switching element 1. An output voltage detecting circuit 164 feeds back the output voltage Vo to a VCC terminal of the semiconductor device 100.

Thus, the semiconductor device (regulation circuit) 100 described above in Embodiment 2 is also applicable to switching power supplies other than the fly back type.

What is claimed is:

1. A switching power supply comprising:
    a transformer having a primary winding and a secondary winding;
    a switching element;
    a control circuit controlling a switching operation of the switching element to perform switching control on a first DC voltage input to the switching element via the primary winding; and
    an output voltage generating section converting a voltage generated in the secondary winding by the switching operation of the switching element, into a second DC voltage and supplying the second DC voltage to a load,
    wherein the control circuit comprises:
    a drain current limiting circuit generating a signal turning off the switching element when a current flowing through the switching element reaches a set value;
    a secondary current on period detecting circuit detecting a first period during which a secondary current flows, the secondary current starting to flow through the secondary winding after the switching element is turned off;
    a secondary current on duty control circuit oscillating a clock signal turning on the switching element so as to maintain, at a constant value, an on duty ratio of the first period to a third period comprising the first period and a second period during which the secondary current does not flow; and
    a secondary current on duty modulating circuit applying a modulation component to the on duty ratio to periodically modulate the on duty ratio.

2. The switching power supply according to claim 1, wherein the secondary current on duty control circuit comprises a capacitance, a charging and discharging circuit charging and discharging the capacitance in synchronism with the first period and the second period, and a comparison circuit generating a signal turning on the switching element, when a voltage of the capacitance is detected on a basis of a set voltage, and the secondary current on duty modulating circuit applies the modulation component to one of a charge current into the capacitance and a discharge current from the capacitance.

3. The switching power supply according to claim 1, wherein the secondary current on duty control circuit comprises a capacitance, a charging and discharging circuit charging and discharging the capacitance in synchronism with the first period and the second period, and a comparison circuit generating a signal turning on the switching element, when a voltage of the capacitance is detected on a basis of a set voltage, and the secondary current on duty modulating circuit applies the modulation component to the set voltage.

4. The switching power supply according to claim 1, wherein the secondary current on period detecting circuit detects, as a timing when the secondary current stops flowing, a timing of inversion of a voltage polarity which occurs first in each of the windings in the transformer after the switching element is turned off.

5. The switching power supply according to claim 4, wherein the secondary current on period detecting circuit detects, as the timing when the secondary current stops flowing, a timing of inversion of the voltage polarity which occurs in the primary winding.

6. The switching power supply according to claim 4, wherein the transformer further has an auxiliary winding, and the secondary current on period detecting circuit detects, as the timing when the secondary current stops flowing, a timing of inversion of a voltage polarity which occurs in the auxiliary winding.

7. A switching power supply comprising:
    a transformer having a primary winding and a secondary winding;
    a switching element;
    a control circuit controlling a switching operation of the switching element to perform switching control on a first DC voltage input to the switching element via the primary winding; and
    an output voltage generating section converting a voltage generated in the secondary winding by the switching operation of the switching element, into a second DC voltage and supplying the second DC voltage to a load,
    wherein the control circuit comprises:
    a drain current limiting circuit generating a signal turning off the switching element when a current flowing through the switching element reaches a set value;
    a PFM control circuit having a function of oscillating a clock signal turning on the switching element and a function of varying a frequency of the clock signal depending on the second DC voltage so that the second DC voltage is maintained at a constant value; and
    a PFM frequency modulating circuit applying a modulation component to the frequency of the clock signal so as to periodically modulate the frequency of the clock signal.

8. The switching power supply according to claim 7, wherein the PFM frequency modulating circuit varies a modulation range of the frequency of the clock signal depending on the second DC voltage.

9. The switching power supply according to claim 7, wherein the PFM frequency modulating circuit varies a modulation period of the frequency of the clock signal depending on the second DC voltage.

10. A switching power supply comprising:
a transformer having a primary winding and a secondary winding;
a switching element;
a control circuit controlling a switching operation of the switching element to perform switching control on a first DC voltage input to the switching element via the primary winding; and
an output voltage generating section converting a voltage generated in the secondary winding by the switching operation of the switching element, into a second DC voltage and supplying the second DC voltage to a load,
wherein the control circuit comprises:
a drain current limiting circuit generating a signal turning off the switching element when a current flowing through the switching element reaches a set value;
a PFM control circuit having a function of oscillating a first clock signal turning on the switching element and a function of varying a frequency of the first clock signal depending on the second DC voltage so that the second DC voltage is maintained at a constant value;
a secondary current on period detecting circuit detecting a first period during which a secondary current flows, the secondary current starting to flow through the secondary winding after the switching element is turned off;
a secondary current on duty control circuit oscillating a second clock signal turning on the switching element so as to maintain, at a constant value, an on duty ratio of the first period to a third period comprising the first period and a second period during which the secondary current does not flow;
a clock signal selecting circuit selecting one having a lower frequency out of the first and second clock signals to turn on the switching element using the selected clock signal; and
a modulation circuit having a function of applying a modulation component to the frequency of the first clock signal and a function of applying a modulation component to the on duty ratio to periodically modulate the frequency of the first clock signal and the on duty ratio using the modulation components applied thereto.

11. A regulation circuit comprising:
a switching element;
a first terminal serving as an input terminal of the switching element and connected to a first winding in an external transformer;
a second terminal serving as an output terminal of the switching element;
a third terminal connected to any one of windings in the transformer; and
a control circuit controlling a switching operation of the switching element to perform switching control on a DC voltage input to the switching element via the first terminal,
wherein the control circuit comprises:
a drain current limiting circuit generating a signal turning off the switching element when a current flowing through the switching element reaches a set value;
a secondary current on period detecting circuit connected to the third terminal detecting a first period during which a secondary current flows, the secondary current starting to flow through the secondary winding in the transformer after the switching element is turned off;
a secondary current on duty control circuit oscillating a clock signal turning on the switching element so as to maintain, at a constant value, an on duty ratio of the first period to a third period comprising the first period and a second period during which the secondary current does not flow; and
a secondary current on duty modulating circuit applying a modulation component to the on duty ratio to periodically modulate the on duty ratio.

12. The regulation circuit according to claim 11, comprising an integrated circuit having the switching element and the control circuit both formed on a same semiconductor substrate.

13. A regulation circuit comprising:
a switching element;
a first terminal serving as an input terminal of the switching element and connected to a first winding in an external transformer;
a second terminal serving as an output terminal of the switching element;
a control circuit controlling a switching operation of the switching element to perform switching control on a first DC voltage input to the switching element via the first terminal; and
a third terminal to which a voltage corresponding to a second DC voltage supplied to an external load is input,
wherein the control circuit comprises:
a drain current limiting circuit generating a signal turning off the switching element when a current flowing through the switching element reaches a set value;
a PFM control circuit having a function of oscillating a clock signal turning on the switching element and a function of varying a frequency of the clock signal depending on the voltage input to the third terminal so that the second DC voltage is maintained at a constant value; and
a PFM frequency modulating circuit applying a modulation component to the frequency of the clock signal so as to periodically modulate the frequency of the clock signal.

14. The regulation circuit according to claim 13, comprising an integrated circuit having the switching element and the control circuit both formed on a same semiconductor substrate.

15. A regulation circuit comprising:
a switching element;
a first terminal serving as an input terminal of the switching element and connected to a first winding in an external transformer;
a second terminal serving as an output terminal of the switching element;
a control circuit controlling a switching operation of the switching element to perform switching control on a first DC voltage input to the switching element via the first terminal;
a third terminal to which a voltage corresponding to a second DC voltage supplied to an external load is input; and
a fourth terminal connected to any one of windings in the transformer,
wherein the control circuit comprises:
a drain current limiting circuit generating a signal turning off the switching element when a current flowing through the switching element reaches a set value;

a PFM control circuit having a function of oscillating a first clock signal turning on the switching element and a function of varying a frequency of the first clock signal depending on the voltage input to the third terminal so that the second DC voltage is maintained at a constant value;

a secondary current on period detecting circuit connected to the fourth terminal and detecting a first period during which a secondary current flows, the secondary current starting to flow through a secondary winding in the transformer after the switching element is turned off;

a secondary current on duty control circuit oscillating a second clock signal turning on the switching element so as to maintain, at a constant value, an on duty ratio of the first period to a third period comprising the first period and a second period during which the secondary current does not flow;

a clock signal selecting circuit selecting one having a lower frequency out of the first and second clock signals to turn on the switching element using the selected clock signal; and a modulation circuit having a function of applying a modulation component to the frequency of the first clock signal and a function of applying a modulation component to the on duty ratio to periodically modulate the frequency of the first clock signal and the on duty ratio using the modulation components applied thereto.

16. The regulation circuit according to claim 15, comprising an integrated circuit having the switching element and the control circuit both formed on a same semiconductor substrate.

* * * * *